(12) United States Patent
Kimijima et al.

(10) Patent No.: US 8,083,850 B2
(45) Date of Patent: Dec. 27, 2011

(54) METHOD OF BRAKE FLUID DISPOSAL AND GRINDING AID FOR CEMENT MATERIAL

(75) Inventors: Takeyuki Kimijima, Tokyo (JP); Akira Ono, Tokyo (JP)

(73) Assignee: Sumitomo Osaka Cement Co., Ltd., Tokoyo (JP)

( * ) Notice: Subject to any disclaimer, the term of this patent is extended or adjusted under 35 U.S.C. 154(b) by 337 days.

(21) Appl. No.: 12/443,079

(22) PCT Filed: Sep. 27, 2007

(86) PCT No.: PCT/JP2007/068854
§ 371 (c)(1),
(2), (4) Date: Mar. 26, 2009

(87) PCT Pub. No.: WO2008/038732
PCT Pub. Date: Apr. 3, 2008

(65) Prior Publication Data
US 2009/0266271 A1    Oct. 29, 2009

(30) Foreign Application Priority Data

Sep. 28, 2006  (JP) ................. 2006-265171

(51) Int. Cl.
*C04B 40/00* (2006.01)
*C04B 24/00* (2006.01)
*C04B 14/00* (2006.01)
*E21B 33/13* (2006.01)

(52) U.S. Cl. ......... 106/697; 106/822; 106/724; 166/293
(58) Field of Classification Search ................. None
See application file for complete search history.

(56) References Cited

FOREIGN PATENT DOCUMENTS

| | | | |
|---|---|---|---|
| JP | 02298366 A | 12/1990 |
| JP | 05177124 A | 7/1993 |
| JP | 06087643 A | 3/1994 |
| JP | 2003002706 A | 1/2003 |
| JP | 2004167885 A | 6/2004 |
| JP | 2005089287 A | 4/2005 |
| KR | 20050108767 | * 11/2005 |

OTHER PUBLICATIONS

Automotive Recyclers Association. "ECAR Fact Sheet for California Brake Fluid". Nov. 2004 [Retrieved on Apr. 12, 2011]. Retrieved on [http://replay.waybackmachine.org/20041127204409/http://www.ecarcenter.org/CA/ca-brakefluid.htm].*

* cited by examiner

*Primary Examiner* — James McDonough
*Assistant Examiner* — Karam Hijji
(74) *Attorney, Agent, or Firm* — The Webb Law Firm

(57) ABSTRACT

Provided is a method of brake fluid disposal which is characterized in that glycol-based brake fluid is recovered from vehicles, and the recovered glycol-based brake fluid is added to a grinding step of a cement material production facility. Furthermore, a method of brake fluid disposal is characterized in that the recovered glycol-based brake fluid is mixed with diethylene glycol. With these methods, it is possible to reduce troublesome works and effectively utilize the resources in cement material production facilities.

4 Claims, 2 Drawing Sheets

METHOD OF BRAKE FLUID DISPOSAL AND GRINDING AID FOR CEMENT MATERIAL

FIELD OF THE INVENTION

The present invention relates to a method of brake fluid disposal that enables waste brake fluid to be effectively utilized as a resource, and a grinding aid for cement material using brake fluid.

BACKGROUND OF THE INVENTION

In cement plants, glycols, such as ethylene glycol and diethylene glycol, alkanolamines, such as triethyanolamine and triisopropanolamine are used as grinding aids in grinding cement products, etc.

Conventionally, from the view point of reduction in manufacturing costs of cement products and natural environment conservation, there are proposed, for example, utilization of wastewater discharged from semiconductor plants or machinery plants as the grinding aid (Patent Document 1), and utilization of waste coolant liquid taken out from automobiles, etc., as the grinding aid (Patent Document 2).

Patent Document 1: Japanese Patent Application Laid-open No. 2003-2706
Patent Document 2: Japanese Patent Application Laid-open No. 2004-167885

SUMMARY OF THE INVENTION

Problems to be Solved by the Invention

However, in the above conventional arts, there are problems in which the glycol concentration of factory wastewater or waste coolant liquid is not kept constant, which leads to the necessity to pre-adjust the glycol concentration or adjust the amount of the waste to be added according to the glycol concentration, which involves troublesome works.

Therefore, an object of the present invention is to reduce troublesome works as much as possible in the aforesaid cement material production facilities, while at the same time achieve efficient utilization of resources.

Means to Solve the Problems

The present inventors paid notice to used brake fluids taken out from automobiles when they are subjected to safety inspection or scrapped, found that glycol-based brake fluid among such brake fluids is suitable as a grinding aid for cement materials, and thus accomplished the present invention.

Specifically, according to the present invention, there is provided a method of brake fluid disposal which is characterized in that glycol-based brake fluid, which has been recovered from vehicles, is added to cement materials and the cement materials are ground in cement production facilities.

The method of brake fluid disposal of the present invention is also characterized in that the recovered glycol-based brake fluid is mixed with diethylene glycol.

The present inventors further found out that the glycol-based brake fluid is suitable as an aid for suppressing dust flying, which prevents generating and flying of dusts when in use of cement materials, and also suitable as a strength reinforcing aid for reinforcing the set cement materials when it is mixed into the cement materials, and thus accomplished the present invention.

Specifically, according to the present invention, there is provided a method of brake fluid disposal, which is characterized in that glycol-based brake fluid, which has been recovered from vehicles, is added to cement materials.

According to another aspect of the present invention, there is provided a grinding aid for cement materials, which is characterized in that glycol-based brake fluid, which has been recovered from vehicles, is mixed with diethylene glycol.

Advantages of the Invention

Glycol-based brake fluid recovered from vehicles contains less water and is formulated with glycols of very high concentration and therefore using the glycol-based brake fluid can omit troublesome works of, such as, adjusting the concentration or amount to be added for each recovered fluid, and omit the necessity for the step of separating water from the fluid.

Thus, by utilizing the glycol-based brake fluid as a grinding aid or utilizing the same as a dust-flying suppressing aid by adding the fluid to cement materials, it is possible to reduce troublesome works in cement production facilities, while efficiently utilizing resources.

Furthermore, a grinding aid for cement materials, in which glycol-based brake fluid recovered from vehicles is mixed with diethylene glycol, can not only increase the grinding efficiency of cement materials, but also produce a significant effect of improving both the short age strength and long age strength, of cement compositions produced by using the grinding aid.

Still furthermore, according to the method of brake fluid disposal and the grinding aid for cement materials of the present invention, it is possible to produce an effect of reducing drying shrinkage when the produced cement materials have been set.

DESCRIPTION OF REFERENCE NUMERALS

Figure 1:
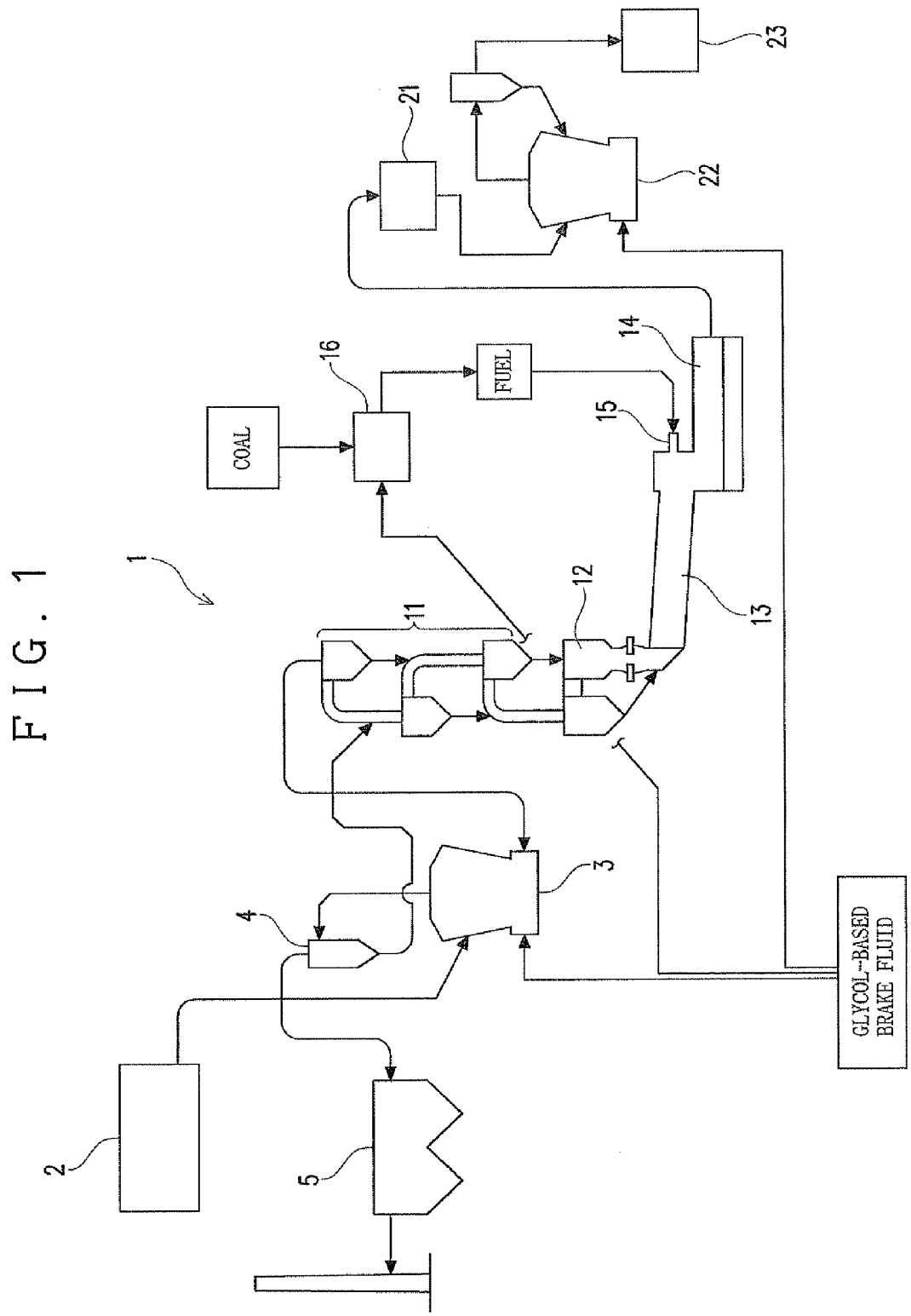
FIG. 1 illustrates a schematic diagram illustrating one embodiment of a method of brake fluid disposal according to the present invention.

| DESCRIPTION OF REFERENCE NUMERALS | |
|---|---|
| 1: | cement production facility |
| 2: | cement material storage facility |
| 3: | material grinding machine |
| 4: | cyclone |
| 5: | electric dust collector |
| 11: | suspension pre-heater (pre-heating device) |
| 12: | calcinations furnace |
| 13: | rotary kiln |
| 14: | clinker cooler (cooler) |
| 15: | burner (burning device) |
| 16: | coal grinding machine |
| 21: | clinker silo |
| 22: | finish grinding machine |
| 23: | cement silo |

DETAILED DESCRIPTION OF THE PREFERRED EMBODIMENT

Now, the description will be made for an embodiment of the present invention with reference to the drawings attached hereto.

FIG. 1 is a schematic diagram illustrating one embodiment in a case where the method of brake fluid disposal of the present invention is carried out in a cement production facility. As illustrated in FIG. 1, as similar to a conventional cement production facility, a cement production facility 1 comprises mainly three steps, namely a material grinding step of grinding cement materials, a cement burning step of burning cement materials formulated in the material grinding step, and a finishing step of finishing burned cement clinker.

Specifically, as illustrated in FIG. 1, the material grinding step is achieved by, for example, a cement material storage facility 2 for storage of cement materials, such as limestone, clay, silica rock and iron oxide, a material grinding machine 3 for drying and grinding cement materials supplied from the cement storage facility 2, a cyclone 4 for separating gasses from the cement materials ground at the material grinding machine 3, and an electric dust collector 5 for processing the separated gasses.

The cement burning step is achieved by a suspension pre-heater (pre-heating device) 11, a calcinations furnace 12, a rotary kiln 13 and a clinker cooler (cooler) 14, as well as a coal grinding machine 16 for grinding coal, a burner (burning device) 15 for heating the inside of the rotary kiln to a predetermined temperature by burring finely ground powdered coal together with fuel.

The finishing step is achieved by a clinker silo 21 for storing produced cement clinker, a finish grinding machine 22 for grinding a cement product to a predetermined particle size, which cement product is produced by mixing cement clinker supplied from the clinker silo 21 with other cement materials, such as gypsum, and a cement silo 23 for storing a cement product prepared by the finish grinding machine 22.

In this embodiment, glycol-based brake fluid recovered from vehicles is designed to be added to the material grinding machine 3, the coal grinding machine 16 and the finishing grinding machine 22.

The glycol-based brake fluid is classified in a category different from silicon-based brake fluid, and generally contains about 98 wt. % glycols before use, and the glycols are still contained about 95 wt. % or more even when the brake fluid is recovered after use.

Specifically, by employing the recovered glycol-based brake fluid, large labor and time are not required for separation of water from, such as, waste coolant unlike those containing a large amount of water, and thus there is an advantage in that the recovered glycol-based brake fluid can be used without taking such separation.

Since the concentration of the contained glycols is substantially constant, there is an advantage in that the adjustment of the glycol concentration or adjustment of the amount to be added to a grinding machine can be remarkably facilitated.

Examples of the glycols contained in the glycol-based brake fluid include glycol, glycol ether, polyglycol, polyglycol ether, and boric acid esters thereof. Among them, preferably used are those having little or not more than 5% ethyl glycol or diethylene glycol, and contains as main components (i.e., components of the greatest amount) polyglycol ether and polyglycol having 20 or more molecular weight.

When glycol-based brake fluid is added to the material grinding machine 3, the coal grinding machine 16 and the finish grinding machine, glycols contained in the glycol-based brake fluid produces the same effect as that of diethylene glycol conventionally added as a grinding aid, and hence can increase the grinding efficiency of these cement materials, coal and cement products, etc. That is, it is assumed that glycol-based brake fluid increases the grinding efficiency by improving the dispersibility of cement particles, etc., suppressing coagulation of particles, as well as preventing coating on the inner wall of the grinding machine or grinding media. Since the glycol-based brake fluid contains less water, it is unlikely to be hydrated with cement or other hydraulic material.

Furthermore, in the present invention, glycol-based brake fluid is preferably mixed with diethylene glycol to produce a grinding aid. Mixing glycol-based brake fluid with diethylene glycol increases the short age strength of cement cured body as compared with the case in which the glycol-based brake fluid is solely used as a grinding aid; and increases the long age strength of cement cured body as compared with the case in which the diethylene glycol is solely used as a grinding aid.

In addition, these advantageous effects of the present invention can be produced even when the total amount of the grinding aids is the same (i.e., the case in which the content of each component is small), as compared with the case in which the glycol-based brake fluid or the diethylene glycol is solely used.

The mixing proportion between glycol-based brake fluid and diethylene glycol is preferably 30:70 to 70:30 in mass ratio, more preferably 40:60 to 60:40 in mass ratio and much more preferably 45:55 to 55:45 in mass ratio.

The amount of the grinding aid having the glycol-based brake fluid mixed with the diethylene glycol relative to cement or other mixture to be ground may be the same as that conventionally applied, and, for example, the amount of the grinding aid may be 0.01 to 0.05 parts by weight relative to 100 parts by weight of cement or other mixtures.

Although the description was made for the aforesaid embodiment by taking, for example, a cement production facility as a cement-material production facility, the present invention is not necessarily limited to the cement production facility, while it is possible to apply the present invention to other cement-material production facilities. Also, the description was made for the aforesaid embodiment by taking, for example, the material grinding machine, the coal grinding machine and the finish grinding machine as a grinding step, but the grinding step for the present invention is not necessarily limited to these.

The glycol-based brake fluid can be used as a strength reinforcing aid for reinforcing the strength of the cured cement by being added to cement materials produced at the cement-material production facility and can be used as a dust generation suppressing aid by being mixed with the cement material, as well.

A cement material is not necessarily limited to a specific one as long as it is a powdered product which contains cement or other hydraulic material. Examples thereof include various portland cements such as ordinary, high-early-strength, ultra-high-early-strength, white, sulfate-resistant, moderate-heat and low heat portland cements, blended cement having the portland cement mixed with blast furnace slag or fly ash, special cements such as jet cement and alumina cement, and cement-based solidifying materials.

Especially, when the glycol-based brake fluid is added to a cement-based solidifying material for use in ground improvement, it is possible to effectively prevent dust generation during ground improvement of a substrate layer by using the cement-based solidifying material.

EXAMPLES

Measurement of Grinding Efficiency of Cement

Series 1

Example 1

Ground portland cement and gypsum byproduced by an exhaust gas desulfurizer were mixed together to produce a mixture having a content of $SO_3$ of 2.0% by weight. Then, glycol-based brake fluid recovered from vehicles was added to this mixture in such a manner that the amount of glycols added reaches 0.03 parts by weight relative to 100 parts by weight of the mixture.

The resulting mixture is ground by a ball mill and the relationship between the grinding time and the fineness was determined.

Comparative Example 1

The grinding test was performed in the same manner as Example 1 except that in place of glycol-based brake fluid, diethylene glycol was added at the same ratio.

Comparative Example 2

The grinding test was performed in the same manner as Example 1 except that glycol-based brake fluid was not added. The result is shown in FIG. 2.

Figure 2:
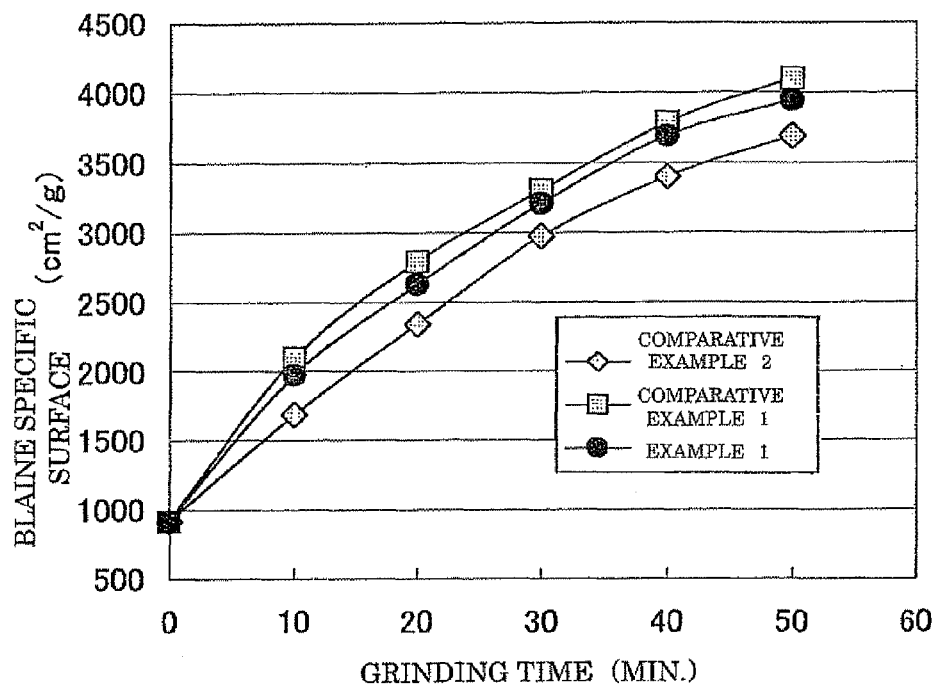
FIG. 2 is a graph showing the influences over the grinding efficiency caused by addition of glycol-based brake fluid (in case of Series 1).

In FIG. 2, the grinding efficiency of Example 1 using, as a grinding aid, glycol-based brake fluid recovered from vehicles, is greatly improved as compared with Comparative Example 2 with no grinding aid added, and thus it is found that Example 1 produces substantially the same effect as that of Comparative Example 1, in which diethylene glycol generally used as a grinding aid is added.

Series 2

Example 2, Comparative Examples 3, 4

The relationship between the grinding time and the fineness was determined in the same manner as Example 1 and Comparative Examples 1, 2 of Series 1, except that portland cement clinker of a different lot was used.

Example 3

Furthermore, the relationship between the grinding time and the fineness was determined by using, as a grinding aid, a mixture produced by mixing glycol-based brake fluid (BF) recovered from vehicles and diethylene glycol (DEG) together at the weight ratio of 50:50.

Figure 3:
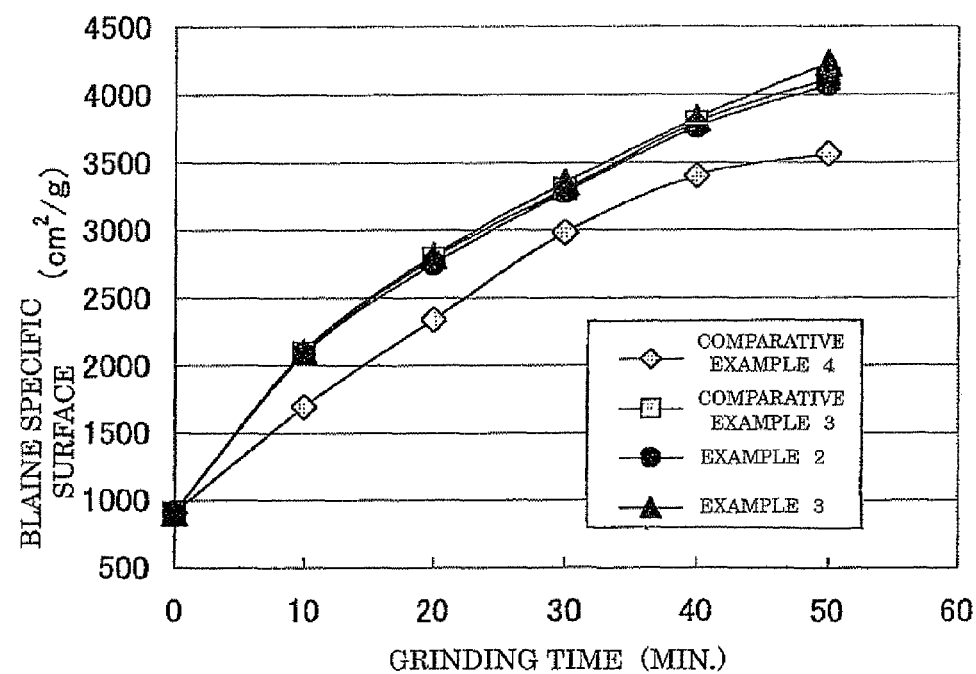
FIG. 3 is a graph showing the influences over the grinding efficiency caused by addition of glycol-based brake fluid (in case of Series 2).

The result is shown in FIG. 3.

In FIG. 3, the grinding efficiency of Example 2 using, as a grinding aid, glycol-based brake fluid recovered from vehicles, is greatly improved as compared with Comparative Example 4 with no grinding aid added, and thus it is found that Example 2 produces substantially the same effect as that of Comparative Example 3 in which diethylene glycol generally used as a grinding aid is added.

Also, it is found that Example 3 having the glycol-based brake fluid mixed with an equal amount of diethylene glycol produces substantially the same effect of Comparative Example 3 in which diethylene glycol is solely added Measurement of Strength Reinforcing Effect Comparative Example 5

Portland cement clinker is mixed with gypsum byproduced by an exhaust gas desulfurizer to have a content of $SO^3$ of 2.0% by weight, and then the resulting mixture is ground for 30 minutes by a ball mill to produce a cement composition having a Blaine specific surface of 3300 $cm^2$.

Furthermore, with respect to the cement composition, a cement paste prepared with a water content of 27.8% following a testing method stipulated by JIS R 5201 "Physical testing methods of cement" was measured in terms of the starting time, the ending time, and the compressive strength at the age of 3 days, 7 days and 28 days, respectively. The result is shown in Table 1.

Comparative Example 6

Mixing was made to have diethylene glycol of 0.03 parts by weight relative to 100 parts by weight of a cement composition produced by the aforesaid Comparative Example 5 and the same measurement as that of Comparative Example 5 was made.

Example 4

Glycol-based brake fluid (BF) recovered from vehicles was mixed with the cement composition produced by the aforesaid Comparative Example 5 to have a content of glycols of 0.03 parts by weight relative to 100 parts by weight of the cement composition, and thus the same measurement as that of Comparative Example 5 was made.

Example 5

The testing was made in the same manner as that of Example 4 except that a mixture having glycol-based brake fluid (BF) recovered from vehicles mixed with diethylene glycol (DEG) at a weight ratio of 70:30 was used.

Example 6

The testing was made in the same manner as that of Example 4 except that a mixture having glycol-based brake fluid (BF) recovered from vehicles mixed with diethylene glycol (DEG) at a weight ratio of 50:50 was used.

Example 7

The testing was made in the same manner as that of Example 4 except that a mixture having glycol-based brake fluid (BF) recovered from vehicles mixed with diethylene glycol (DEG) at a weight ratio of 30:70 was used.

TABLE 1

| | Composition [wt %] | | Volume of water | Setting time [hour:min] | | Compressive strength [N/mm$^2$] | | |
|---|---|---|---|---|---|---|---|---|
| | BF | DEG | (%) | Starting | Ending | 3 days | 7 days | 28 days |
| Example 4 | 100 | 0 | 27.8 | 1-45 | 2-43 | 30.5 | 47.6 | 66.1 |
| Example 5 | 70 | 30 | 27.8 | 1-35 | 2-33 | 32.9 | 47.8 | 65.0 |
| Example 6 | 50 | 50 | 27.8 | 1-32 | 2-29 | 33.4 | 48.0 | 65.0 |
| Example 7 | 30 | 70 | 27.8 | 1-32 | 2-30 | 33.5 | 47.9 | 65.7 |
| Comparative Example 5 | — | — | 27.8 | 1-43 | 2-45 | 30.3 | 46.1 | 65.4 |
| Comparative Example 6 | 0 | 100 | 27.8 | 1-32 | 2-29 | 33.7 | 47.8 | 63.6 |

According to Table 1, in case of Comparative Example 6 in which only the diethylene glycol is mixed, it is possible to increase the initial strength (3-day strength), but it is found that the long age strength (28-day strength) is lowered as compared with Comparative Example 4 having no addition. On the contrary, in case of Examples 5-7 in which a mixture of brake fluid and diethylene glycol are mixed, it is found that the initial strength (3-day strength) can be increased, while maintaining the long age strength (28-day strength) equivalent to Example 4 having only the brake fluid mixed.

Any of Examples is substantially the same as Comparative Example 5 in terms of setting time, and thus it is found that the initial strength can be increased without causing adverse influences on setting.

Measurement of Effect of Reducing Drying Shrinkage

Example 8 and Comparative Example 7

By using materials shown in the following Table 2, respectively prepared concrete of Example 8 having waste brake fluid (BF) added in the ratio shown in the following Table 3, and concrete of Comparative Example 7 having no waste brake fluid added.

TABLE 2

Materials used

| Material | Abbr. | Name (Trade name) | Production region/ Manufacturer |
|---|---|---|---|
| Water | W | Clean water | — |
| Cement | C | Ordinary portland cement | Sumitomo Osaka Cement Co., Ltd. |
| Fine aggregate | S | River sand: density of 2.56 and fineness modulus of 2.72 | Produced at Yasu, Shiga Prefecture |
| Coarse aggregate | G | Crushed stone: density of 2.63 and fineness modulus of 6.62 | Produced at Nishijima, Hyogo Prefecture |
| Admixture | SP | Pozzolith No. 70 | NMB Ltd. |
| Waste brake fluid | BF | — | — |

TABLE 3

Composition of concrete

| | BF | | Unit quantity (kg/m$^3$) | | | | SP |
|---|---|---|---|---|---|---|---|
| | (C × %) | W/C | W | C | S | G | (C × %) |
| Example 8 | 1.5 | 45.5 | 170 | 374 | 821 | 936 | 0.25 |
| Comparative Example 7 | 0 | 45.5 | 170 | 374 | 821 | 936 | 0.25 |

The produced concretes of Example 8 and Comparative Example 7 were measured in terms of the properties of concrete (slump, and changes of air content and length), following JIS A 1129-2 "Testing methods for length change of mortar and concrete-Part 2: Method with contact-type strain gauge". The result is shown in the following Table 4.

TABLE 4

| | Properties of concrete | | | | |
|---|---|---|---|---|---|
| | Slump | Air content | Length change (×10$^{-4}$) | | |
| | (cm) | (%) | 5 weeks | 10 weeks | 20 weeks |
| Example 8 | 7.6 | 4.1 | 2.1 | 3.9 | 5.1 |
| Comparative Example 7 | 8.2 | 4.7 | 5.4 | 6.5 | 7.2 |

As shown in Table 4, regarding Example 8 having waste brake fluid added, the length change after curing is greatly reduced as compared with the concrete of Comparative Example 7 having no waste brake fluid added.

Measurement of Effect of Suppressing Dusts

Example 9

Cement of Example 9 was prepared by placing 30 kg of ordinary portland cement and 450 g of waste brake fluid (1.5% by weight relative to the cement) into a V-type blender having a volume of 100 litters, and then stirring them for 30 minutes.

The thus obtained 100 g of cement is dropped into a square column shaped container having a width of 30 cm, a depth of 30 cm and a height of 100 cm through a hole having a diameter of 3 cm provided at the center of an upper surface of the container through a pipe; then air within the container is sucked at a rate of 0.3 litters/min through a hole in a side wall positioned 20 cm higher than the bottom surface of the container and then drawn into a dust counter at which particles having a diameter not smaller than 0.5 µm are counted. Thus, the dust concentration was measured.

Comparative Example 8

Cement of Comparative Example 8 was prepared in the same manner except that waste brake fluid is not added, and the same testing was made. The result is shown in Table 5.

TABLE 5

| | BF (C × %) | Dust concentration (piece/m³) |
|---|---|---|
| Example 9 | 1.5 | $1.2 \times 10^7$ |
| Comparative Example 8 | 0 | $2.1 \times 10^9$ |

As shown in Table 5, the dust concentration of cement of Example 9 having waste brake fluid added is greatly reduced as compared with cement of Comparative Example 8 having no waste brake fluid added, and thus it is found that dusts are effectively prevented from being generated during handling of cement.

The invention claimed is:

1. A method of brake fluid disposal, wherein a glycol-based brake fluid which has been recovered from vehicles is added to cement materials and the cement materials are ground, and
    wherein the glycol-based brake fluid contains 95 wt. % or more of glycols.
2. The method of brake fluid disposal according to claim 1, wherein the recovered glycol-based brake fluid is mixed with diethylene glycol.
3. A method of brake fluid disposal, wherein a glycol-based brake fluid which has been recovered from vehicles is added to cement materials, and
    wherein the glycol-based brake fluid contains 95 wt. % or more of glycols.
4. The method of brake fluid disposal according to claim 3, wherein the recovered glycol-based brake fluid is mixed with diethylene glycol.

* * * * *